United States Patent
Danzig

(10) Patent No.: US 9,230,234 B2
(45) Date of Patent: Jan. 5, 2016

(54) METHOD AND SYSTEM FOR AN INVENTORY AGGREGATOR

(71) Applicant: Steve Danzig, Spokane, WA (US)

(72) Inventor: Steve Danzig, Spokane, WA (US)

(*) Notice: Subject to any disclaimer, the term of this patent is extended or adjusted under 35 U.S.C. 154(b) by 127 days.

(21) Appl. No.: 13/668,822

(22) Filed: Nov. 5, 2012

(65) Prior Publication Data

US 2013/0117163 A1    May 9, 2013

Related U.S. Application Data

(60) Provisional application No. 61/555,037, filed on Nov. 3, 2011.

(51) Int. Cl.
*G06Q 10/00* (2012.01)
*G06Q 10/08* (2012.01)

(52) U.S. Cl.
CPC .................. *G06Q 10/087* (2013.01)

(58) Field of Classification Search
None
See application file for complete search history.

(56) References Cited

U.S. PATENT DOCUMENTS

| | | | |
|---|---|---|---|
| 6,820,082 B1* | 11/2004 | Cook et al. | 707/754 |
| 7,315,834 B2* | 1/2008 | Martineau et al. | 705/26.8 |
| 8,666,846 B1* | 3/2014 | Chenault | G06Q 30/0601 705/22 |
| 2002/0002500 A1* | 1/2002 | Takahashi | 705/26 |
| 2006/0095346 A1* | 5/2006 | Gambhir | G06Q 10/087 705/28 |

* cited by examiner

*Primary Examiner* — Paul Danneman
(74) *Attorney, Agent, or Firm* — Maier & Maier, PLLC

(57) ABSTRACT

A system and method for aggregating and listing inventory. The system may include a database for storing data in a plurality of record classes. The record classes may include data pertaining at least to a plurality of inventory and may include any variety of identifying data for each inventory record. The database may be a relational database, and the records may be grouped in a plurality of classes, which may be interrelated. The system may further include a search engine for searching the database so as to find and return a list of inventory based on desired criteria.

13 Claims, 4 Drawing Sheets

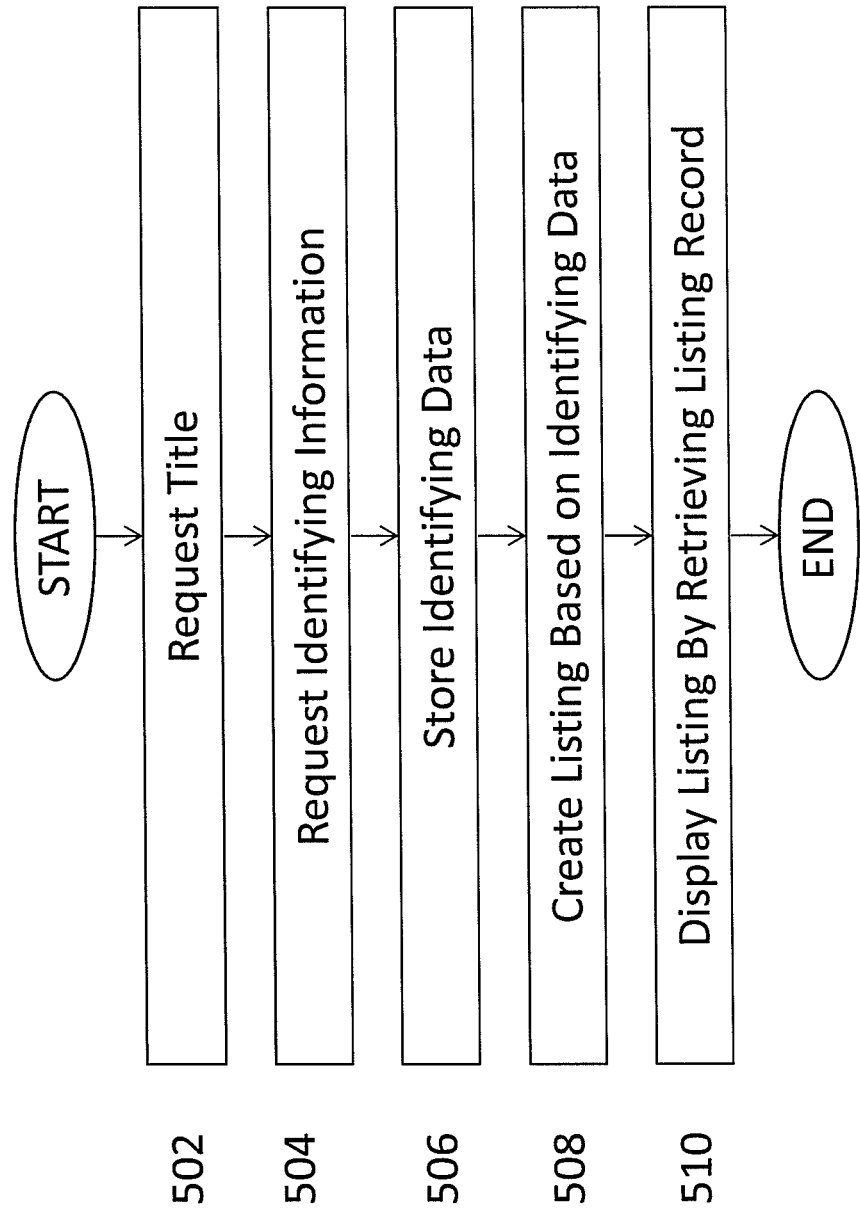

METHOD AND SYSTEM FOR AN INVENTORY AGGREGATOR

RELATED APPLICATIONS

This application claims priority to U.S. Provisional Application No. 61/555,037, filed Nov. 3, 2011, the contents of which are herein incorporated by reference.

BACKGROUND

The development and accessibility of the Internet has served to provide cheap and pervasive marketing and sales opportunities. Many small businesses have taken advantage of these opportunities to expand their customer bases. However, a wider customer base requires a business to keep larger quantities of inventory in stock and develop more extensive inventory control mechanisms. While expansion on the Internet is relatively cheap and simple, physical expansion is expensive, time-consuming and risky. This is especially true when the business is dealing in larger, more expensive products, such as vehicles, and in smaller items with high cost. Thus, a system which allows various businesses to aggregate inventory in order to meet Internet-generated interest is desired.

SUMMARY

According to one exemplary embodiment, an inventory aggregator is disclosed. An inventory aggregator may relate to a system and method for item-based searching based on, among other criteria, specific businesses, locations and products. The system may include a database which may store a wide variety of records. The database may be a relational database and the records stored therein may relate to inventory held by various businesses. The records may be organized, sorted, or otherwise grouped by any desirable criteria, such as location, business or type of inventory. Any inventory uploaded to the database may be presented on a collection of web pages, wherein specific web pages may be devoted to specific businesses.

Each business may upload data relating to their inventory into the database. Additionally, a business may select other businesses' inventory to be displayed on their own specific web page. In this manner, businesses may expand their offerings without increasing the amount of physical inventory actually kept in stock. The system may further provide business owners the ability to manually or automatically control the profit margin associated with specific products. Once inventory is uploaded or selected, the database may organize the inventory and allow users to browse, compare, watch, purchase, submit offers, or trade for certain products. The system may further include a search engine which may facilitate searching by sorting data by various criteria.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 4 is a flow chart of the exemplary operational steps of executing a search.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Generally referring to FIGS. 1-4, a method and system for inventory aggregation may be shown. The system may include a database, which may be a relational database, configured to allow users to upload data relating to physical inventory. Further, the database may allow users to share or aggregate their inventory in order to present a larger menu of options to potential customers. A search engine may be incorporated into this system in order to allow users to parse the data stored therein by various criteria.

Figure 1:
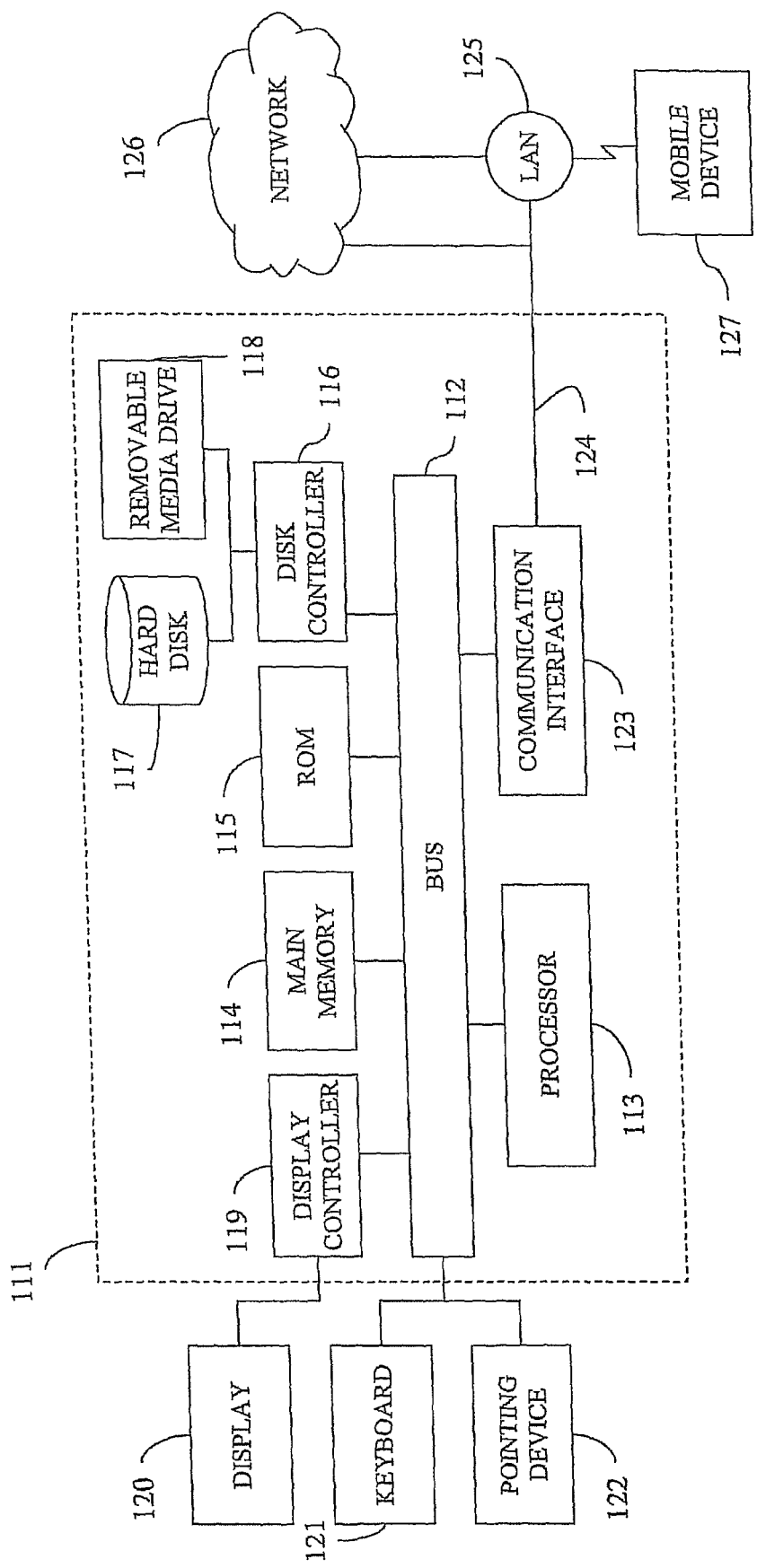
FIG. 1 is a diagram of an exemplary computer system.

FIG. 1 illustrates an exemplary computer system 111 upon which an embodiment of the present invention may be implemented. The computer system 111 includes a bus 112 or other communication mechanism for communicating information, and a processor 113 coupled with the bus 112 for processing the information. The computer system 111 also includes a main memory 114, such as a random access memory (RAM) or other dynamic storage device (e.g., dynamic RAM (DRAM), static RAM (SRAM), and synchronous DRAM (SDRAM)), coupled to the bus 112 for storing information and instructions to be executed by processor 113. In addition, the main memory 114 may be used for storing temporary variables or other intermediate information during the execution of instructions by the processor 113. The computer system 111 further includes a read only memory (ROM) 115 or other static storage device (e.g., programmable ROM (PROM), erasable PROM (EPROM), and electrically erasable PROM (EEPROM)) coupled to the bus 112 for storing static information and instructions for the processor 113.

The computer system 111 also includes a disk controller 116 coupled to the bus 112 to control one or more storage devices for storing information and instructions, such as a magnetic hard disk 117, and a removable media drive 118 (e.g., floppy disk drive, read-only compact disc drive, read/write compact disc drive, compact disc jukebox, tape drive, and removable magneto-optical drive). The storage devices may be added to the computer system 111 using an appropriate device interface (e.g., small computer system interface (SCSI), integrated device electronics (IDE), enhanced-IDE (E-IDE), direct memory access (DMA), or ultra-DMA).

Further, exemplary embodiments include or incorporate at least one database which may store software, descriptive data, system data, digital images and any other data item required by the other components necessary to effectuate any embodiment of the present system known to one having ordinary skill in the art. The database may be provided, for example, as a database management system (DBMS), a relational database management system (e.g., DB2, ACCESS, etc.), an object-oriented database management system (ODBMS), a file system or another conventional database package as a few non-limiting examples. The database can be accessed via a Structure Query Language (SQL) or other tools known to one having skill in the art.

Still referring to FIG. 1, the computer system 111 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 111 may also include a display controller 119 coupled to bus 112 to control a display 120, such as a cathode ray tube (CRT), liquid crystal display (LCD) or any other type of display, for displaying information to a computer client. The computer system includes input devices, such as a keyboard 121 and a pointing device 122, for interacting with a computer client and providing information to the processor 113. Additionally, a touch screen could be employed in conjunction with display 120. The pointing device 122, for example, may be a mouse, a trackball, or a pointing stick for communicating direction information and command selections to the processor 113 and for controlling cursor movement on the display 120. In addition, a printer may provide printed listings of data stored and/or generated by the computer system 111.

The computer system 111 performs a portion or all of the processing steps of the invention in response to the processor 113 executing one or more sequences of one or more instructions contained in a memory, such as the main memory 114. Such instructions may be read into the main memory 114 from another computer readable medium, such as a hard disk 117 or a removable media drive 118. One or more processors in a multi-processing arrangement may also be employed to execute the sequences of instructions contained in main memory 114. In alternative embodiments, hard-wired circuitry may be used in place of or in combination with software instructions. Thus, embodiments are not limited to any specific combination of hardware circuitry and software.

As stated above, the computer system 111 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 111, for driving a device or devices for implementing the invention, and for enabling the computer system 111 to interact with a human client. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 113 for execution. A computer readable medium may take many forms, including but not limited to, non-volatile media, volatile media, and transmission media. Non-volatile media includes, for example, optical, magnetic disks, and magneto-optical disks, such as the hard disk 117 or the removable media drive 118. Volatile media includes dynamic memory, such as the main memory 114. Transmission media includes coaxial cables, copper wire and fiber optics, including the wires that make up the bus 112. Transmission media also may also take the form of acoustic or light waves, such as those generated during radio wave and infrared data communications.

Various forms of computer readable media may be involved in carrying out one or more sequences of one or more instructions to processor 113 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 111 may receive the data on the telephone line and use an infrared transmitter to convert the data to an infrared signal. An infrared detector coupled to the bus 112 can receive the data carried in the infrared signal and place the data on the bus 112. The bus 112 carries the data to the main memory 114, from which the processor 113 retrieves and executes the instructions. The instructions received by the main memory 114 may optionally be stored on storage device 117 or 118 either before or after execution by processor 113.

The computer system 111 also includes a communication interface 123 coupled to the bus 112. The communication interface 123 provides a two-way data communication coupling to a network link 124 that is connected to, for example, a local area network (LAN) 125, or to another communications network 126 such as the Internet. For example, the communication interface 123 may be a network interface card to attach to any packet switched LAN. As another example, the communication interface 123 may be a wireless link. In any such implementation, the communication interface 123 sends and receives electrical, electromagnetic or optical signals that carry digital data streams representing various types of information.

The network link 124 typically provides data communication through one or more networks to other data devices. For example, the network link 124 may provide a connection to another computer or remotely located presentation device through a local network 125 (e.g., an 802.11-compliant wireless network) or through equipment operated by a service provider, which provides communication services through a communications network 126. In preferred embodiments, the local network 124 and the communications network 126 preferably use electrical, electromagnetic, or optical signals that carry digital data streams. The signals through the various networks and the signals on the network link 124 and through the communication interface 123, which carry the digital data to and from the computer system 111, are exemplary forms of carrier waves transporting the information. The computer system 111 can transmit and receive data, including program code, through the network(s) 125 and 126, the network link 124 and the communication interface 123. Moreover, the network link 124 may provide a connection through a LAN 125 to a mobile device 127 such as a personal digital assistant (PDA) laptop computer, or cellular telephone. The LAN communications network 125 and the communications network 126 both use electrical, electromagnetic or optical signals that carry digital data streams. The signals through the various networks and the signals on the network link 124 and through the communication interface 123, which carry the digital data to and from the system 111, are exemplary forms of carrier waves transporting the information. The processor system 111 can transmit notifications and receive data, including program code, through the network(s), the network link 124 and the communication interface 123.

Other aspects of the invention may include data transmission and Internet-related activities. See Preston Gralla, How the Internet Works, Ziff-Davis Press (1996), which is hereby incorporated by reference into this patent application. Still other aspects of the invention may utilize wireless data transmission.

Figure 2:
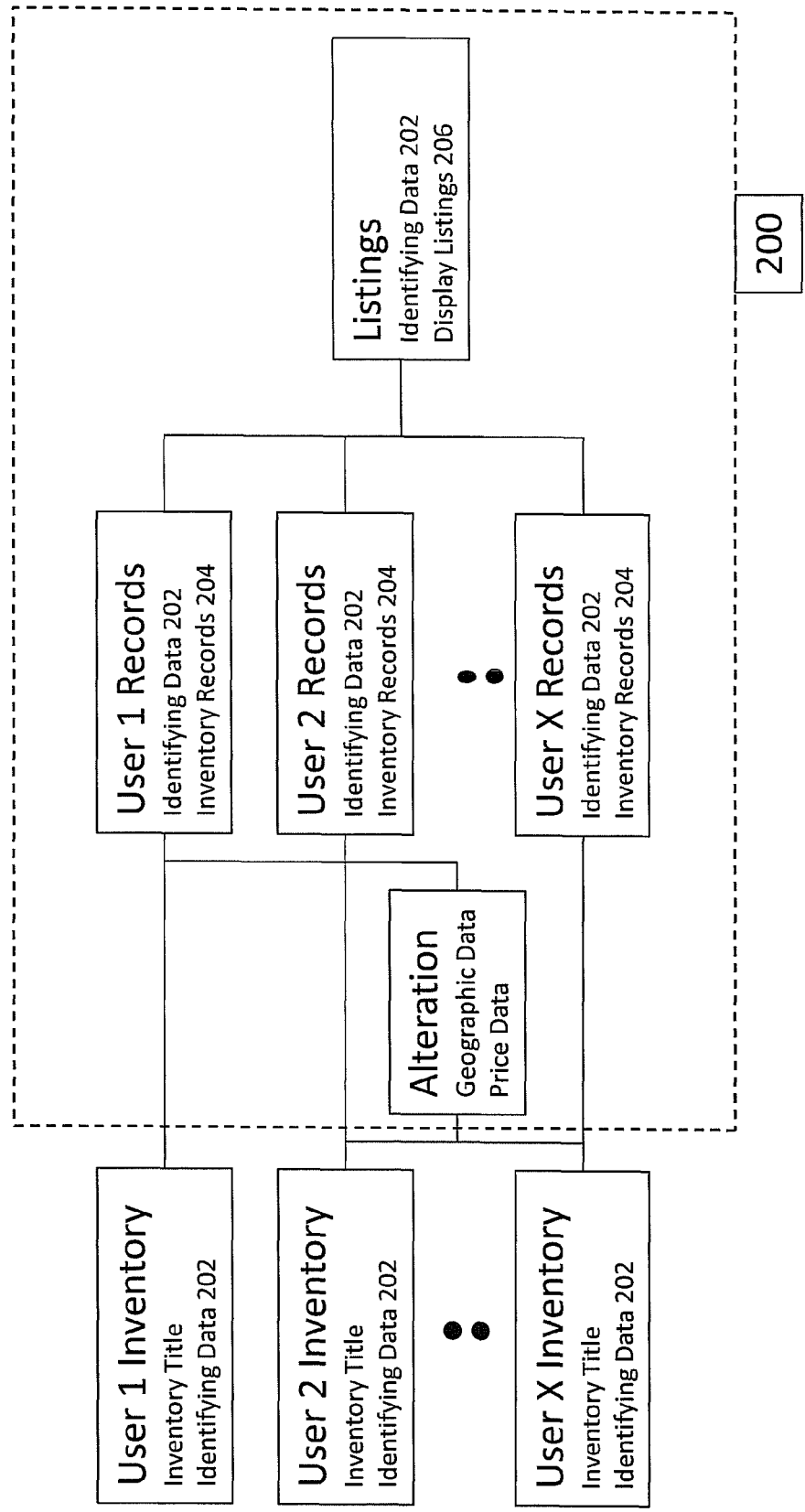
FIG. 2 is a diagram of an exemplary embodiment of an inventory aggregation system.

According to at least one exemplary embodiment, and as shown in FIG. 2, system 200 may be shown. System 200 may be a system of inventory aggregation. System 200 may have a plurality of users. Users may be considered inputting users, non-inputting users, customers or any combination of the above. In one exemplary embodiment, an inputting user who owns the inventory may be able to upload identifying data 202 into the system. Once an inputting user inputs identifying data 202 into the various required fields, the database may create and store an original inventory record 204 representative of the input identifying data 202. The system may allow any number of users who own inventory to input identifying data 202 into the system in order to create original inventory records 204 within the database. Further, System 200 may be able to automatically pull inventory records uploaded by any user, aggregate this data and create comprehensive inventory lists which may identify all of the various different types of inventory stored within the system. The system may also be programmed to group, identify, or eliminate any duplicate listings for the same inputting user.

Figure 3:
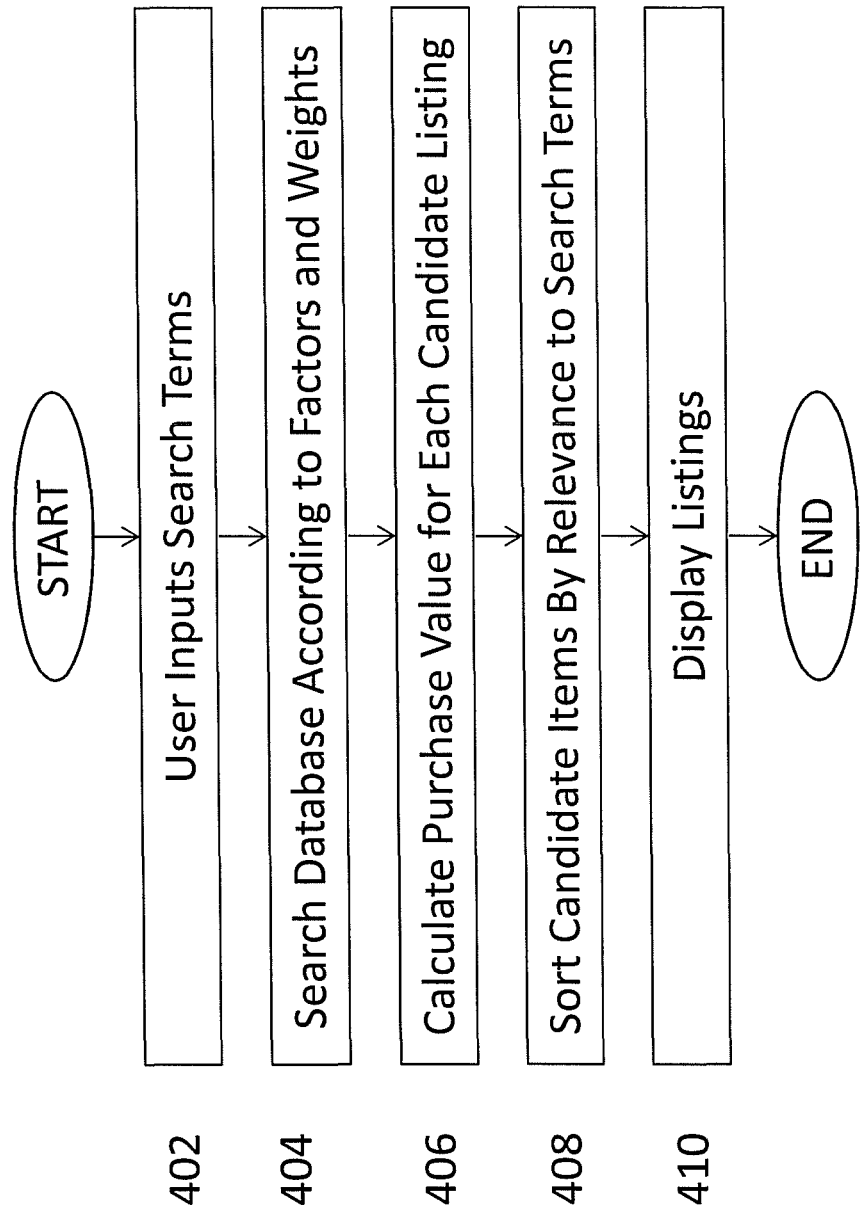
FIG. 3 is a flow chart of exemplary operational steps for listing and aggregating inventory.

The database of system 200 may be configured to accept a wide variety of identifying data 202 relating to the product name, quantity available, quality of the goods, or any other desirable characteristic. For example, the system may be configured to store and aggregate inventory data relating to Recreational Vehicles (RVs). Alternatively, the system may be configured to store and aggregate inventory data relating to any type of product or business. Identifying data may be input into the system through text-input fields, various menus or selections, as desired. The database may be able to accept identifying data 202 in any manner known in the arts. In the exemplary embodiment relating to RVs, system 200 may accept data through text-input fields relating to the Vehicle Identification Number (VIN), vehicle name, mileage, year, length, slide-outs, water capacity, sleeping capacity, generator, awnings, air conditioning, and leveling jacks. Additionally, the system may present the user with options in various menu formats, such as a drop-down menu, in order to collect additional identifying data 202, such as make, model, class, fuel type, and condition. A user may input all of the aforementioned data inputs manually or, alternatively, the system may be configured to accept bulk uploads of data. FIG. 3 illustrates an exemplary bulk input.

Still referring to FIG. 2, any inventory records 204 created from identifying data 202 input by a user may be automatically associated with the user who input the identifying data 202. However, although each inventory record 204 is automatically associated with the user who entered the identifying data 202 relating that specific inventory record 204, each inventory record 204 may also be subsequently associated with inventory of any number of additional non-inputting users. For example, a non-inputting user may select a plurality of original inventory records 204 input by an inputting user to be associated with the non-inputting user. In this example, the non-inputting user may select specific inventory records 204 based on the type of inventory. Alternatively, system 200 may also automatically associate specific original inventory records 204 with a non-inputting user based on user preferences or specific identifying data 202. This feature may, among other benefits, allow any user of the system to increase the quantity or variety of inventory offered without major investment, for example, by downloading selected inventory to a user's own website. Further, multiple users may be able to aggregate inventory for any desirable reason. For example, system 200 may aggregate the inventory of two small businesses in order to allow these small businesses to retain flexibility while offering the customers the same options as a larger company.

If an original inventory record 204 is selected to be associated with a non-inputting user, the system may create a non-inputting record with slightly varied identifying data 202. For example, identifying data relating to geographic location or price may be altered with the selecting non-inputting user's preferences or previously input identifying data 202. For example, with regards to the RV example, if a non-inputting user selects an RV being sold by an inputting user to be associated with the non-inputting user, the non-inputting user may choose to alter some of the identifying data 202. System 200 may prevent the non-inputting user from altering data relating to the specifications or technical detail of the actual product, but may allow the non-inputting user to alter data relating to geographical location or price. For example, system 200 may allow the non-inputting user to alter the price of the selected RV in order to allow both users to profit on a sale. Alternatively system 200 may automatically alter the price of the RV based on a previously input price multiplier of the non-inputting user. Any alteration made by a non-inputting user to an inputting user's original inventory record 204 may not affect the original inventory record 204 associated with the second, but may create a new non-inputting inventory record 204 associated with the non-inputting user.

After system 200 has been populated with all inventory records 204, system 200 may create listings 206 which may be displayed to users based on search criteria 208. The system may utilize a relational database to produce listings 206 which may correlate with search criteria 208. For example, if a user searched for an RV in Louisiana, system 200 may sift through inventory records 204 in order to find records with similar identifying data 202. Upon finding matching or similar inventory records 204, system 200 may display listings 206 for the matching inventory records 204. If a user had become associated with a second user's inventory record 204, multiple listings 206, with slightly varying identifying data 202, might be displayed for the same product. However, system 200 may be programmed to only display one listing per physical product. System 200 may choose the specific listings 208 to be displayed based on geographic location, price, the original user it was associated with, or various other criteria.

According to at least one exemplary embodiment, a method of populating the database of system 200 may be disclosed in exemplary FIG. 3. In the exemplary method, system 200 may be populated with identifying data 202 when data pertaining to a particular inventory is entered into system 200, such as, for example, descriptive data of a particular RV. System 200 may request a title for each listing (step 402) as well as identifying information (step 404). System 200 may store each product listing (step 406) and may subsequently generate a unique original inventory record 204 for the particular item (step 408). Original inventory records 204 may be stored in system 200 and system 200 may associate each inventory record 204 with the particular user who input the data used to create the particular product listing.

Once populated, system 200 may sort the data by type of inventory and display various data types on various collections of web pages. For example, if the product listings pertain to RVs the database may subsequently display the records stored therein on a collection of web pages. In an exemplary embodiment, each user may have a particular web page or collection of web pages associated with them. Alternatively, all of the inventory records 204 may be searchable through a search engine available on a web page or collection of web page. Each user may choose to display records which he or she entered into the system—records which may already be associated with the user—as well as, records input into the system by other users.

Each user may be able to watch or compare any of the listings 206 uploaded to system 200. For example, users may be able to select any desirable number of items to compare side by side. Referring again to the RV example, a user may choose to select four RVs to compare side by side. Once selected for comparison, system 200 may display the identifying data 202 associated with each listing 206, such that the user comparing the items may analyze and compare the specifications of each item. If, for example, the items are RVs, the user may compare the make, model, year and price, among other identifying data 202. Users may be further able to swap or exchange inventory. Thus, users may utilize the comparison feature if they are considering swapping inventory. If, again, system 200 is being utilized for RV inventory, users may desire to exchange or sell RVs when curtailments are coming due.

Once a particular item of inventory is purchased, system 200 may automatically update every listing 206 associated with the identifying data 202 of the particular item of inventory. System 200 may automatically push this sold status through to any user web page or collection of web pages which may have the particular listing 206 posted. For example, if a non-inputting user sells an Airstream RV which was originally posted by an inputting user, the system may automatically remove the inputting user's listing—the original listing—from the inputting user's web page. Additionally, the listing for the Airstream RV may be automatically removed from any other user web pages (i.e. other non-inputting users) which were advertising the RV for sale. In this exemplary scenario, the non-inputting user may have marked up the price of the Airstream RV when it was posted to the non-inputting user's web page. If this was the case, the non-inputting user would be able to earn this markup price, but would be required to pay the inputting user, who actually owns the RV, the entirety of the original price. In other words, the inputting user would receive the full price that the inputting user originally listed, if not otherwise agreed upon.

According to at least one exemplary embodiment, a method of executing a search may be disclosed in exemplary FIG. 4. In the exemplary method, system 200 may return specific listings 206 based on search criteria 208. A user may input any variety of search criteria 208, through various inputs, such as text based inputs or selections from various menus (step 502) into a search engine incorporated into system 200. Upon receiving search criteria 208, system 200 may compare the search criteria 208 to inventory records 204 stored within the database (step 504). Upon finding candidate inventory records 204 to match the search criteria, system 200 may be required to calculate the purchase value for each candidate inventory record 204 (step 506). Step 506 may be necessary if a candidate inventory record 204 is a record which was input by an inputting user and subsequently selected by a non-inputting user who also assigned a price multiplier to the original inventory record 204. Following calculation of the purchase value, system 200 may sort the candidate inventory records 204 by relevance to the search terms (step 508). Once the candidate records are sorted, the most relevant inventory records 204 may be displayed to the user as matching records (step 510).

The database, which may be a relational database, may compare the inventory records 204 to the search criteria 208 based on various factors and weights. For example, if a user searches for a new Airstream RV in Colorado, the database may return any inventory records 204 which match any of one of the three criteria entered—Airstream, new, and located in Colorado. Inventory records 204 which match all three search criteria may be presented first; those which match only two criteria may be presented second, and so on. Further, if system 200 determines that certain factors are more important, these factors may force certain inventory records to be found more relevant. For example, a particular RV's location may be more important than the exact model since shipping an RV might require significant resources.

In some exemplary embodiments, a collection of web pages may be associated with system 200. The web pages may provide an interface for accepting identifying data 202. Users may select to upload identifying data 202 in bulk or may select to manually enter identifying data 202. Users may enter identifying data relating to a specific inventory, which may, for example, be an RV. As mentioned, a user may input identifying data 202 through text based fields or drop down menus, for example.

In a further exemplary embodiment, a web page may show user-selected listings. Once a user has selected various inventory listings 206 to be displayed on his or her personal web page, the user may assign profit margins to each item. This may increase the price of the items when they are displayed for sale on the user's personal web page. In addition, the system 200 may include of a search menu. A search menu may allow a user to input or select search criteria 208 in order to find other users' inventory. This may allow users to locate items which they desire to watch, trade for, purchase, make offer, or otherwise inquire about.

System 200 and the aforementioned methods may allow users to increase, swap and otherwise manage inventory. System 200 may allow users located around the country to increase and diversify their inventory, and in turn, their offerings to customers. System 200 may automatically ensure that only available inventory are offered for sale and easily allow user interaction.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for aggregating inventory, the method implemented on a computer with a processor configured to perform the steps comprising:
   receiving identifying data for at least one inventory item from at least one inputting user;
   uploading the identifying data to a database;
   populating the database with the identifying data to create an original inventory record for each inventory item;
   automatically associating an original inventory record with the at least one inputting user who input the representative identifying data;
   creating an inventory list of all original inventory records;
   accepting at least one search criteria from at least one non-inputting user;
   comparing the at least one search criteria to the inventory list;
   creating a subset list of inventory records based on the comparison of the at least one search criteria and inventory list;
   displaying the subset list to the at least one non-inputting user;
   permitting the at least one non-inputting user to selectively associate the at least one inventory item as their own inventory and create at least one non-inputting inventory record on an independent website of the at least one non-inputting user;
   automatically aggregating each non-inputting inventory record to the inventory list;
   storing the inventory list on the database;
   removing an original inventory record from the inventory list as the result of an event, wherein the event is at least one of the purchase of the at least one inventory item from the original inventory record, the purchase of the at least one inventory item from a non-inputting inventory record, a trade of the at least one inventory item from an inputting user to a non-inputting user, or the removal of the original inventory record by the at least one inputting user; and
   automatically removing any non-inputting inventory record associated with the removed original inventory record from the independent website of the at least one non-inputting user, and automatically removing all non-inputting inventory records for the at least one item of inventory from the independent website of any non-inputting user who was not associated with the event.

2. The method of claim 1, wherein the identifying data includes at least one of a product name, a quantity available, and a quality of goods.

3. The method of claim 1, wherein the identifying data is uploaded manually or by a bulk upload.

4. The method of claim 1, wherein the identifying data is input through at least one of a text based input, a drop down menu, and a selection menu.

5. The method of claim 1, further comprising the step of:
   grouping, identifying and eliminating an inventory record that is a duplicate of an original inventory record, from the same inputting user, already within the inventory list.

6. The method of claim 1, further comprising the step of:
   automatically associating original inventory records with the at least one non-inputting user based on at least one preference supplied by the at least one non-inputting user.

7. The method of claim 1, further comprising the step of:
   permitting the at least one non-inputting user to alter at least some of the identifying data of an original inventory record to create the at least one non-inputting inventory record without changing the original inventory record.

8. The method of claim 7, wherein the at least one non-inputting user alters a price of the identifying data by a price multiplier.

9. The method of claim 1, further comprising the steps of:
   establishing a web interface for any user associated with at least one original inventory record or non-inputting inventory record;
   providing a searchable interface for any person to search and compare any inventory record within the inventory list based upon at least one search criteria.

10. The method of claim 1, further comprising the step of:
    transferring a payment between a purchaser and the at least one inputting user if the at least one inventory item is purchased from the original inventory record.

11. The method of claim 1, further comprising the steps of:
    transferring a payment between a purchaser and a non-inputting user if the at least one inventory is purchased from a non-inputting inventory record; and
    transferring a second payment between the at least one non-inputting user and the inputting user of the at least one inventory item.

12. A system for aggregating inventory, comprising:
    a computer system with a plurality of remote network access points;
    a database in communication with the plurality of network access points;
    an inputting user interface for supplying information about at least one item of inventory from at least one of the network access points to create at least one original inventory record on the database; and
    at least one non-inputting user interface capable of viewing the original inventory record and altering information to create a non-inputting inventory record on an independent website of at least one non-inputting user;
    wherein the database aggregates the original inventory record and all non-inputting inventory records to create an inventory list, and stores the inventory list on the database;
    wherein the database is configured to remove an original inventory record from the inventory list as the result of an event, wherein the event is at least one of the purchase of the at least one item of inventory from the original inventory record, the purchase of the at least one item of inventory from a non-inputting inventory record, a trade of the at least one item of inventory, or the removal of the original inventory record from the inputting user interface; and wherein the database further configured to automatically remove any non-inputting inventory record associated with the removed original inventory record from the independent website of the at least one non-inputting user, and automatically removing all non-inputting inventory records for the at least one item of inventory from the independent website of any non-inputting user who was not associated with the event.

13. The system of claim 12, wherein the database is a relational database.

\* \* \* \* \*